(12) United States Patent
Niezrecki et al.

(10) Patent No.: US 6,779,913 B2
(45) Date of Patent: Aug. 24, 2004

(54) CYCLE ILLUMINATION SYSTEM

(75) Inventors: Christopher Niezrecki, Gainesville, FL (US); Gregory Yoder, Gainesville, FL (US); Matthew Young, Knoxville, TN (US)

(73) Assignee: University of Florida Research Foundation, Inc., Gainesville, FL (US)

( * ) Notice: Subject to any disclaimer, the term of this patent is extended or adjusted under 35 U.S.C. 154(b) by 76 days.

(21) Appl. No.: 10/253,248

(22) Filed: Sep. 23, 2002

(65) Prior Publication Data

US 2003/0067782 A1 Apr. 10, 2003

Related U.S. Application Data

(60) Provisional application No. 60/324,357, filed on Sep. 21, 2001.

(51) Int. Cl.[7] ............................................ F21W 101/023
(52) U.S. Cl. ..................... 362/473; 362/84; 362/500; 362/540
(58) Field of Search ...................... 362/473, 84, 500, 362/540

(56) References Cited

U.S. PATENT DOCUMENTS

| | | |
|---|---|---|
| 4,208,869 A | 6/1980 | Hanaoka |
| 4,775,964 A | 10/1988 | Alessio et al. |
| 4,901,209 A | 2/1990 | Nitz |
| 5,245,517 A | 9/1993 | Fenton |
| 5,513,080 A | 4/1996 | Magle et al. |
| 5,559,680 A | 9/1996 | Tabanera |
| 5,564,128 A | 10/1996 | Richardson |
| 5,620,348 A * | 4/1997 | Santana et al. ............... 362/84 |
| 5,722,760 A | 3/1998 | Chien |
| 5,806,960 A | 9/1998 | Chien |
| 5,813,873 A | 9/1998 | McBain et al. |
| 5,823,653 A | 10/1998 | Elam, Jr. et al. |
| 5,871,269 A | 2/1999 | Chien |
| 5,876,108 A | 3/1999 | Chien |
| 6,059,377 A * | 5/2000 | Wu |
| 6,126,233 A | 10/2000 | Gaetano |
| 6,186,635 B1 * | 2/2001 | Peterson et al. ............... 362/84 |
| 6,386,731 B1 * | 5/2002 | Cheng ......................... 362/192 |

* cited by examiner

*Primary Examiner*—Laura K. Tso
(74) *Attorney, Agent, or Firm*—Saliwanchik, Lloyd & Saliwanchik (57) ABSTRACT

The present invention relates to an electroluminescent illumination system, more particularly to an electroluminescent light system that allows vehicles to be visible during periods of low light, for example bicycles. The EL panels can be selective affixed to any of the bicycle frame members or wheels, where the EL panels are electrically connected to the power source. The power source applies an AC signal to the conductive substrates of the EL panels resulting in the EL material charging and discharging to emitting light.

1 Claim, 9 Drawing Sheets

CYCLE ILLUMINATION SYSTEM

CROSS-REFERENCE TO A RELATED APPLICATION

This application claims the benefit of U.S. Provisional Application No. 60/324,357, filed Sep. 21, 2001.

FIELD OF THE INVENTION

The present invention relates to an electroluminescent illumination system, more particularly to an electroluminescent light system that allows vehicles to be visible during periods of low light, for example bicycles.

BACKGROUND OF THE INVENTION

With the increased interest in physical fitness, more people are turning towards bicycle riding as a method of exercise. In many instances, due to work and school schedules, both adults and children are riding their bicycles during the dusk and nighttime hours. With this increased number of people riding bicycles, there has been an increase in the number of bicycle related accidents. In many instances, these accidents are due to poor visibility of the bicycle to motorists, other bicyclists, and pedestrians.

The most common light reflection devices for a bicycle during low-light hours are reflectors placed on the fork of the bicycle, on the rear of the frame, and between the spokes on the wheels. The biker is often unseen because these do not generate light, but only reflect a direct source of light. This is particularly dangerous for cyclists who ride between dusk, dawn, and night. From the side, a motorist can only see two small reflectors, and has a poor indication of the distance of the bicycle. Moreover, it is difficult to determine as well whether the lights are even a bicycle.

BRIEF SUMMARY OF THE INVENTION

The subject invention is directed to an electroluminescent (EL) system for illuminating vehicles during periods of low light, where the EL system comprises one or more EL panels connected in series or in parallel with a power source. An EL panel comprises an EL material sandwiched between an upper and lower conductive substrate, where at last one of the conductive substrates is optically clear or transparent to allow light to pass therethrough. When the power source applies an AC signal to the conductive substrates the resulting electric field causes the EL material to charge and discharge, resulting in the emission of light during each cycle.

In an example of use, at least one EL panel is affixed to a bicycle frame. The EL panels can be selectively affixed to any of the frame members, including the fork member, upper frame member, the lower frame member, the vertical member, or the rear frame member, where the EL panels are electrically connected to the power source.

Additionally, the EL panels can be affixed to the bicycle wheels, where at least one EL panel is fitted about the spokes of the bicycle wheel 23.

Alternatively, the EL panel can be affixed to the bicycle wheel rim, where the location of EL panel on the bicycle wheel rim is dependent on the braking system of the bicycle.

In a bicycle braking system employing a pad braking system, which contacts the upper portion of the wheel rim, the EL panel is adhered to the lower portion of the rim near the spokes.

Where the bicycle comprises a disc braking system that applies pressure at the hub of the bicycle wheel, the EL panel can be applied to either the upper surface or the lower surface of the bicycle wheel rim.

All patents, patent applications and publications referred to or cited herein, or from which a claim for benefit of priority has been made, are incorporated by reference in their entirety to the extent they are not inconsistent with the explicit teachings of this specification, including: U.S. Pat. No. 4,208,869, Hanaoka; U.S. Pat. No. 4,775,964, Alessio et al.; U.S. Pat. No. 5,245,517, Fenton; U.S. Pat. No. 5,559,680, Tabanera; U.S. Pat. No. 5,564,128, Richardson; U.S. Pat. No. 5,722,760, Chien; U.S. Pat. No. 5,813,873, McBain, et al.; U.S. Pat. No. 5,806,960, Chien; U.S. Pat. No. 5,823,653, Elam, Jr. et al.; U.S. Pat. No. 5,876,108, Chien; and U.S. Pat. No. 6,126,233, Gaetano.

These and other objects, features and advantages of the present invention will be more readily understood with reference to the following detailed description, read in conjunction with the accompanying drawing figures, and the attachments.

DETAILED DISCLOSURE OF THE INVENTION

Figure 1A:
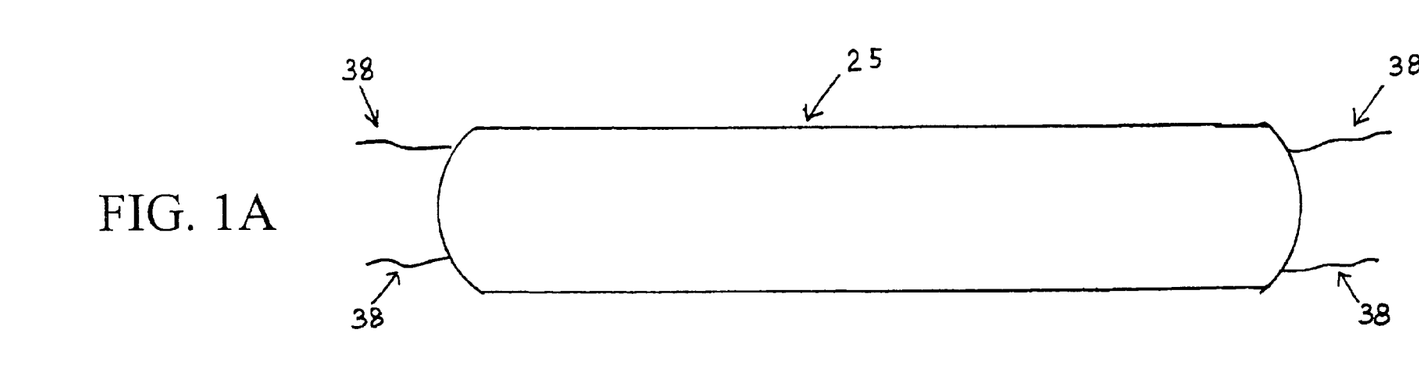
FIGS. 1a–1b depicts an electroluminescent (EL) panel of the subject invention.
Figure 1B:
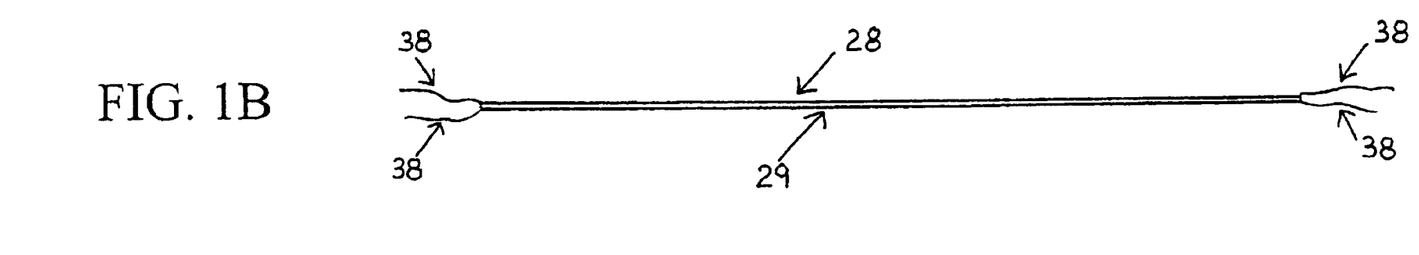
Figure 2:
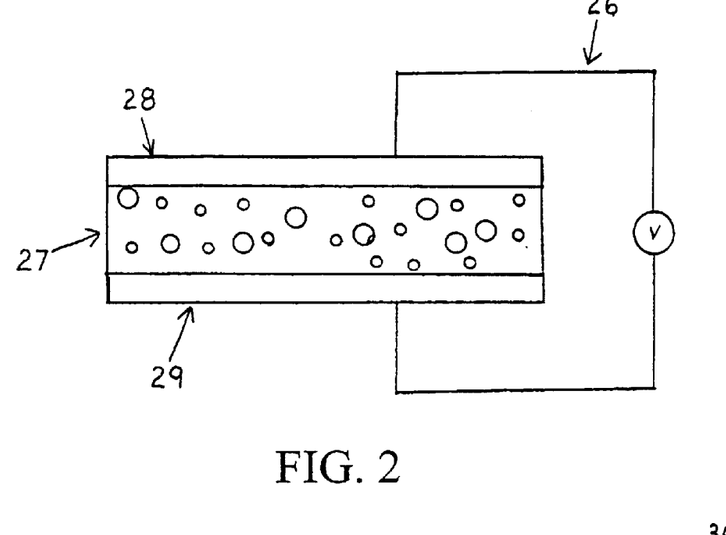
FIG. 2 depicts a cross sectional view of an EL panel of the subject invention.

Referring now to FIGS. 1–2, an embodiment of the electroluminescent (EL) system of the subject invent comprises one or more EL panels 25 connected in series with a power source 26. As is know in the art, the EL panel 25 comprises an EL material 27 sandwiched between an upper 28 and lower 29 conductive substrate, where at last one of the conductive substrates 28,29 is optically clear or transparent to allow light to pass therethrough. When the power source 26 applies an AC signal to the conductive substrates 28,29 the resulting electric field causes the EL material 27 to charge and discharge, resulting in the emission of light during each cycle.

Figure 3:
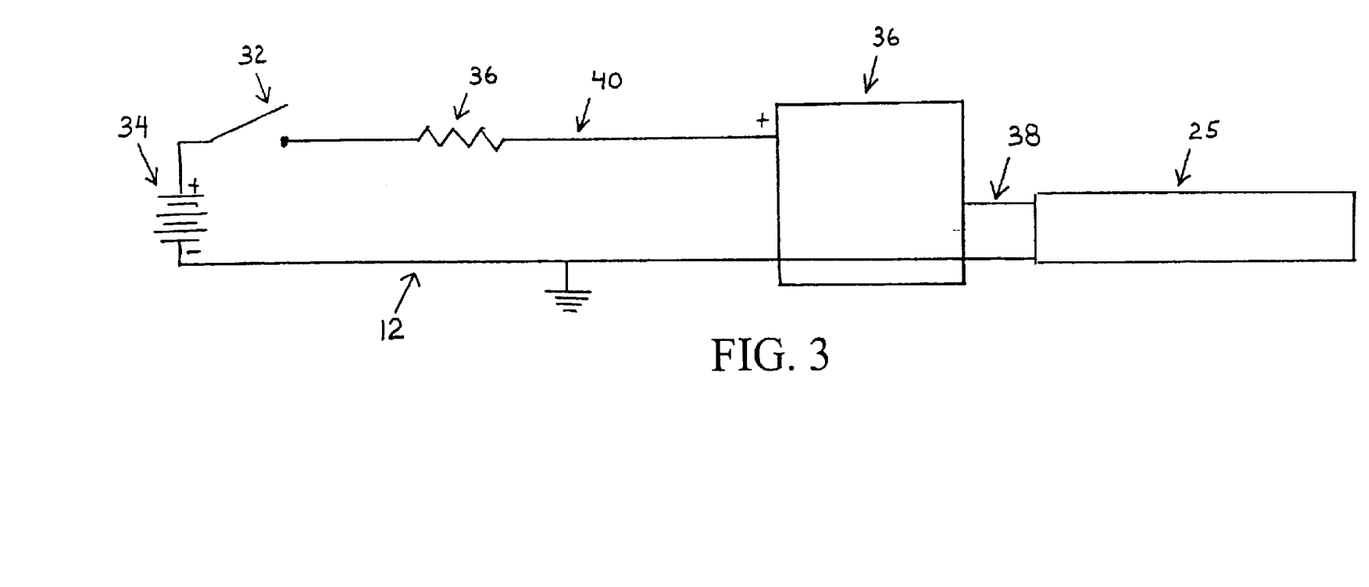
FIG. 3 depicts a schematic diagram of a power source for an EL panel of the subject invention.

In an embodiment, as shown in FIG. 3, the power source's 26 AC signal is supplied by a DC power source 34, where an inverter 30 converts the DC signal to an AC signal. The DC power source 34 is electronically coupled to the inverter 30 though the leads lines 40,42, where a resistor 32 is interposed between the inverter 30 and the DC power source 34. A switch 32 is used to actuate the DC power source 34, such that when the switch 32 is in the closed position, a DC signal is introduced into the inverted 30, which outputs an AC signal though the signal lines 38 to the EL panel 25 causing the EL material 27 to charge and discharge, resulting in the emission of light during each cycle. Since the number of light pulses depends on the amount of applied voltage, increasing the operating voltage and frequency may increase the brightness of the El panel 25.

In alternate embodiments, the DC power source 34 can be a rechargeable battery, a generator, a solar power source, or piezoelectric energy reclamation circuits.

Figure 4:
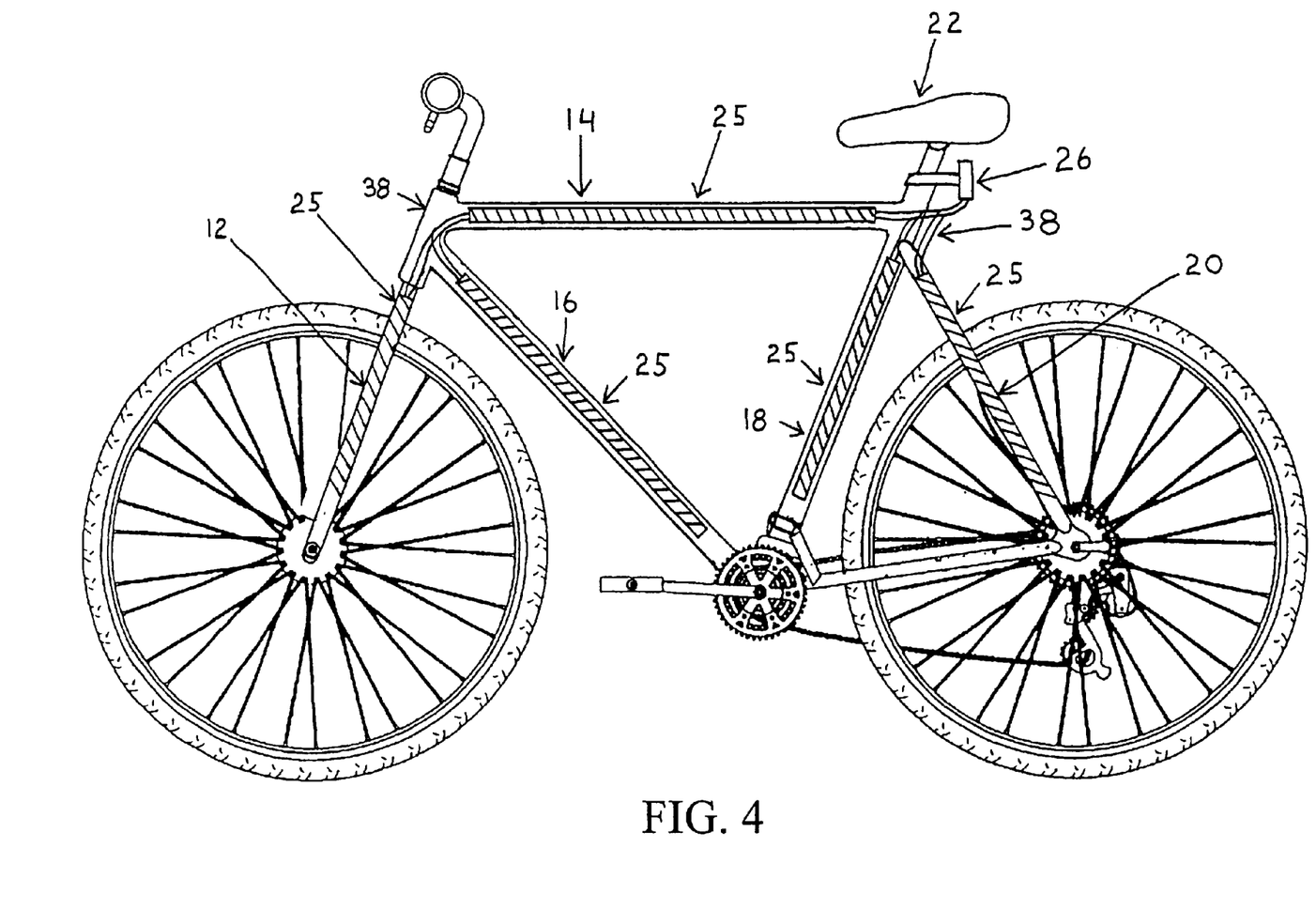
FIG. 4 depicts a side view of EL panels positioned on a bicycle frame.
Figure 5:
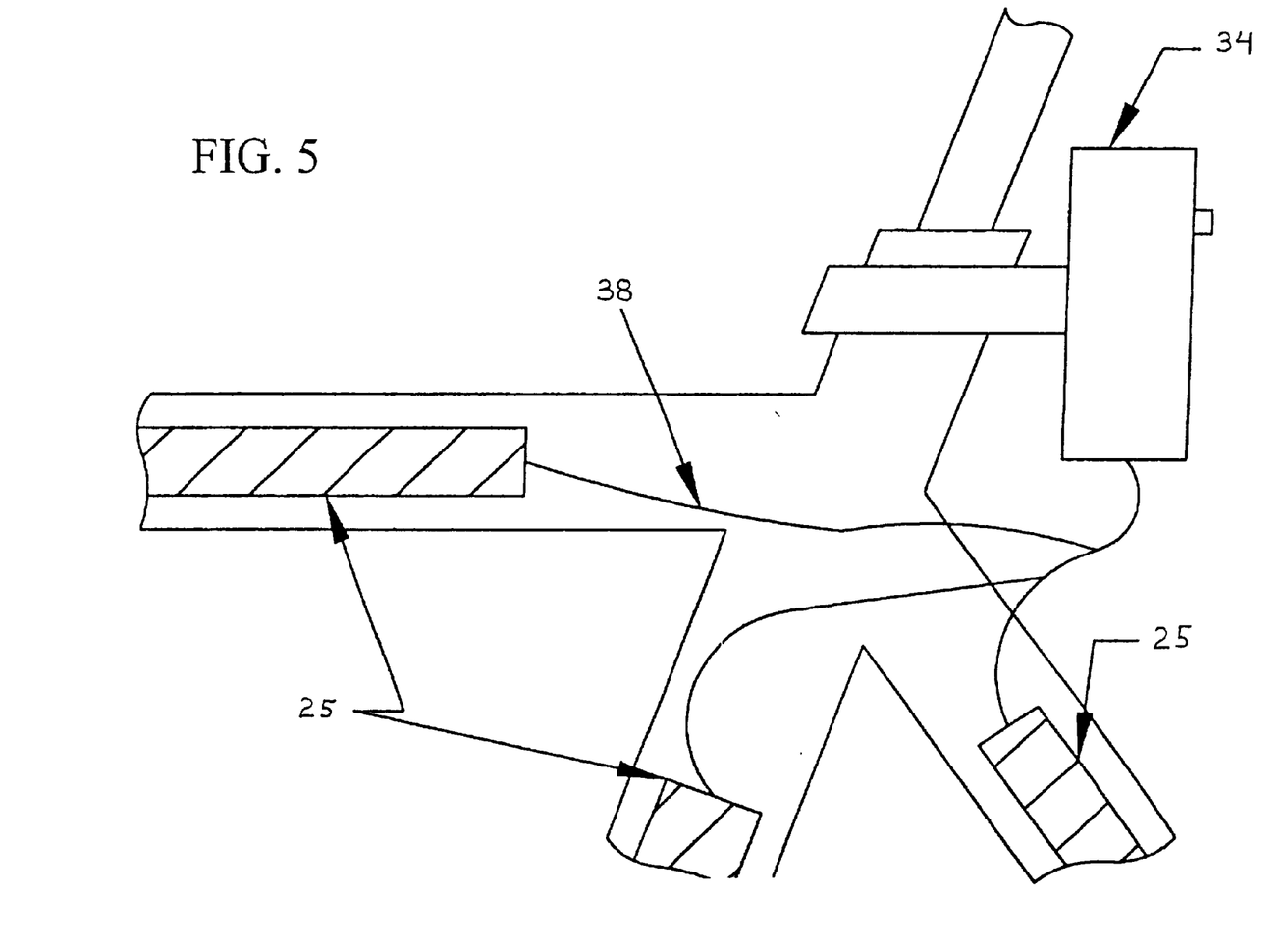
FIG. 5 depicts the electrical connection of the EL panel to the power source on the bicycle frame.

In an embodiment, as shown in FIG. 4, at least one EL panel 25 is affixed to a bicycle frame 10. The EL panels 25 can be selectively affixed to any of the bicycle frame 10 members, including the fork member 12, upper frame member 14, lower frame member 16, vertical member 18, or rear frame member 20, where the EL panels 25 are electrically connected to the power source 26 thought the signal lines 38, and the power source 26 is affixed to the bicycle frame 10 under the bicycle seat 22.

In alternate embodiments, the power source 26 can be affixed to any of the frame members, including the fork member 12, upper frame member 14, lower frame member 16, vertical member 18, or rear frame member 20

Figure 6:
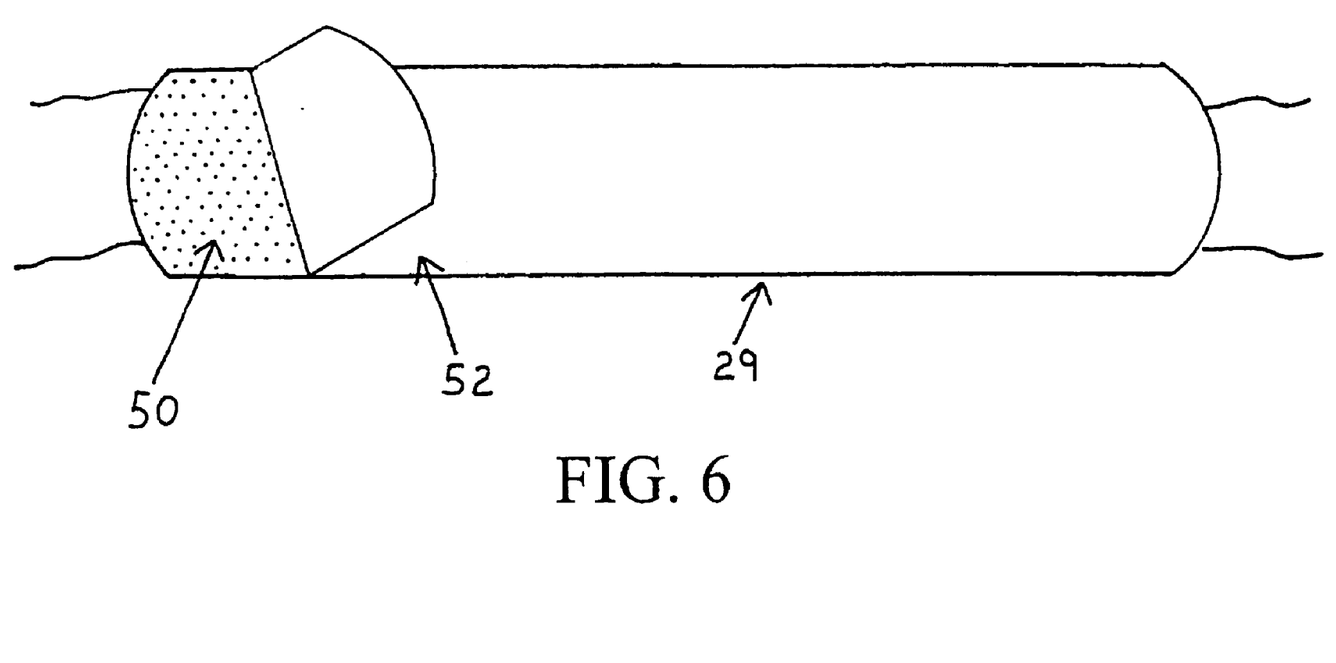
FIG. 6 depicts the adhesive backing, with peel away paper strip on the EL panel.

In an embodiment, a shown in FIG. 6, the EL panels 25 comprise an adhesive backing for mounting on the bicycle frame 10. The adhesive 50 is affixed to the exposed side of the lower substrate 29, being covered by a peel away paper strip 52. To mount an EL panel 25, the peel away paper strip 52 is removed and the EL panel 25 is positioned along the appropriate bicycle frame 10 member.

In an alternate embodiment, the EL panels 25 are affixed to the bicycle frame using; double-sided tape, adhesive spray, or glue to be applied to the frame 10.

Figure 7:
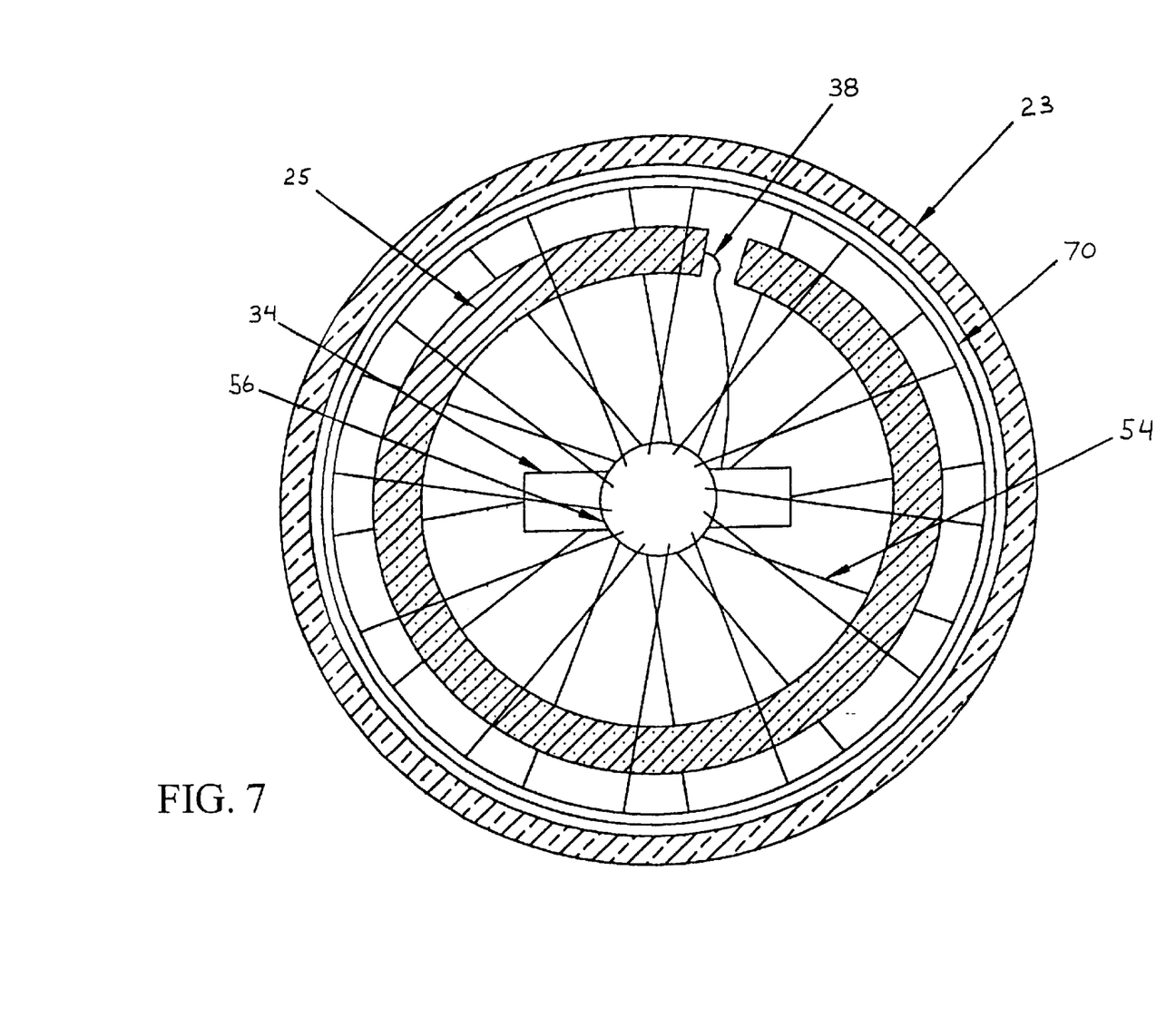
FIG. 7 depicts an EL panel applied to the spokes of a bicycle wheel.

In an embodiment, as shown in FIG. 7, EL panels 25 are affixed to the bicycle wheels 23. At least one EL panel 25 is fitted about the spokes 54 of the bicycle wheel 23, where the EL panel 25 is alternately threaded though the spokes 54, where signal line 38 connects the EL panel 25 to the power source 34.

In an embodiment, the upper 28 and lower 29 substrates are transparent.

In an embodiment, at least one power source 26 is attached to the hub 56 of the bicycle wheel 23. Multiple battery packs or counter weights may be required to balance the power source 26 and to eliminate vibration.

In an alternative embodiment, power is applied to the EL panel 25 by a power source 26 attached to the bicycle frame 10. The bicycle wheel 23 comprises a pair of matching brush sets, where at least one rotating brush is attached to the bicycle wheel axle and at least one fixed brush is attached to the bicycle wheel hub 56, where the rotating brush and the fixed brush are in electrical communication. The signal wires 38 of the EL panel 25 are connected to the rotating brush and the power source 26 is connected to the fixed brush, such that the AC signal is transmitted from the power source 26 to the EL panel 25.

Figure 8:
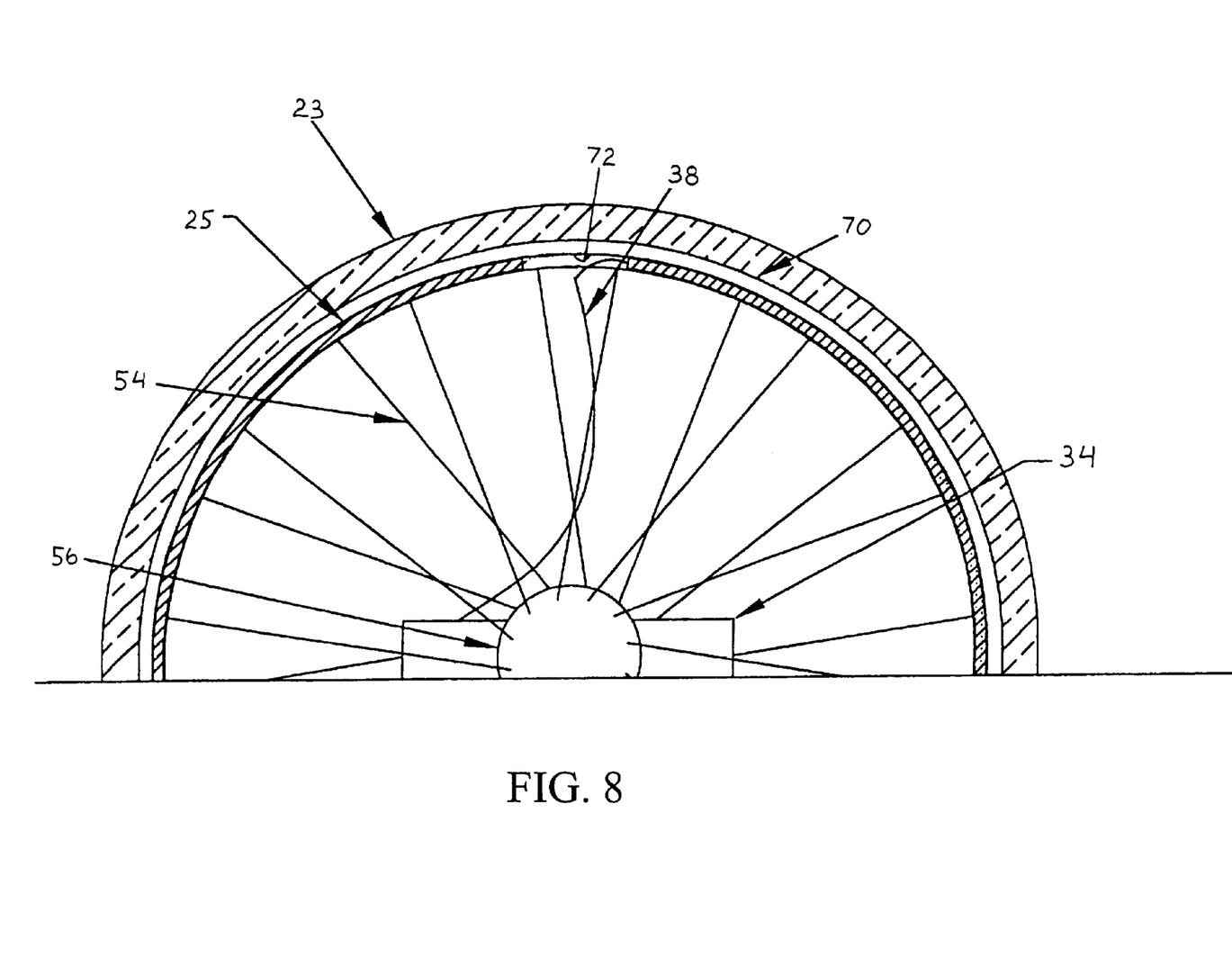
FIG. 8 depicts an EL panel applied to the rim of a bicycle wheel.
Figure 9:
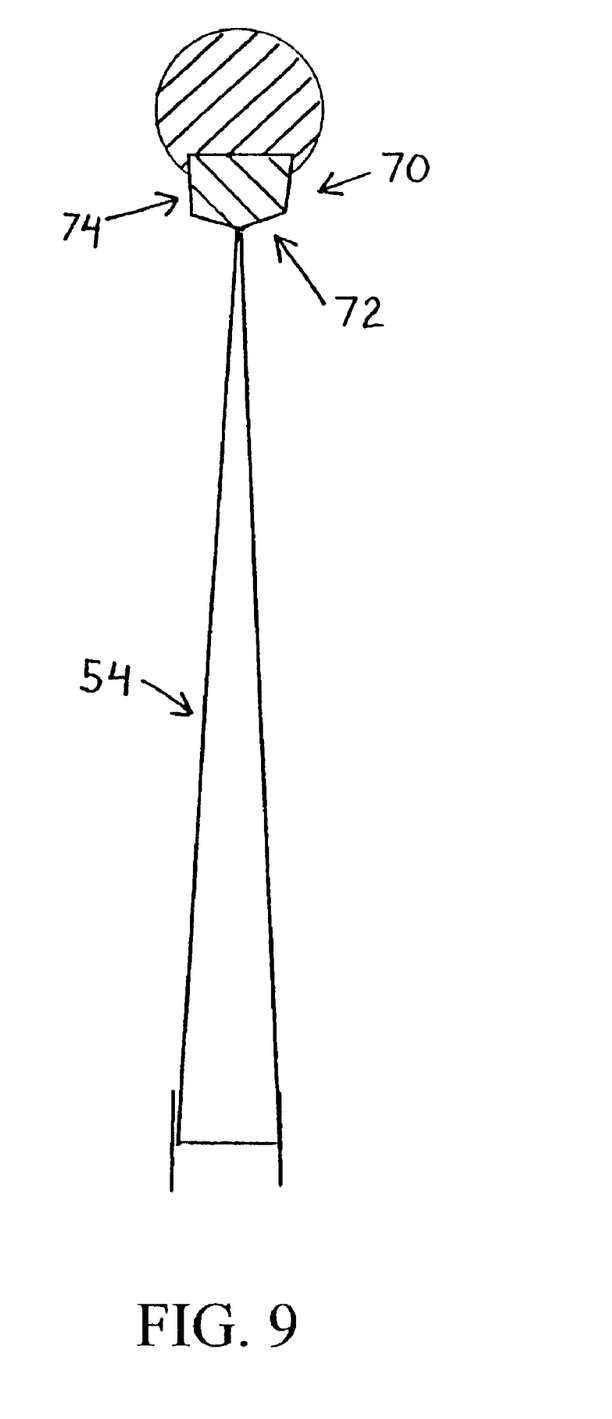
FIG. 9 depicts a cross sectional view of a bicycle wheel.
Figure 10A:
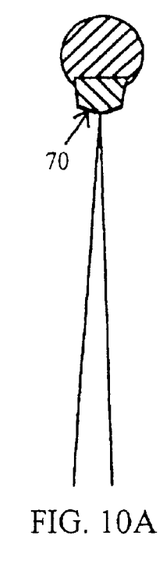
FIGS. 10a–10i depict alternate embodiments of bicycle wheel rim designs.
Figure 10B:
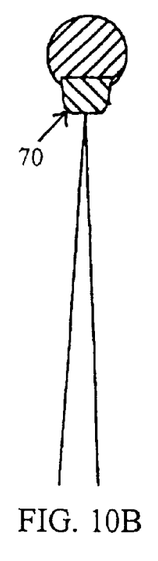
Figure 10C:
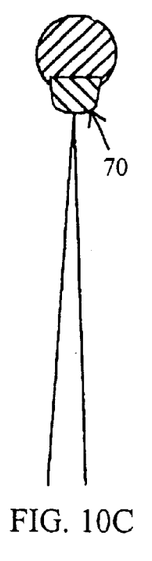
Figure 10D:
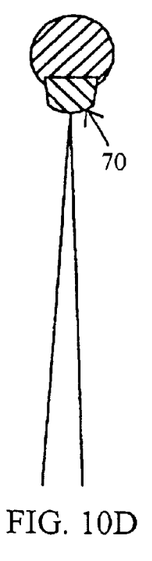
Figure 10E:
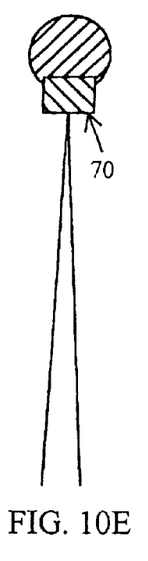
Figure 10F:
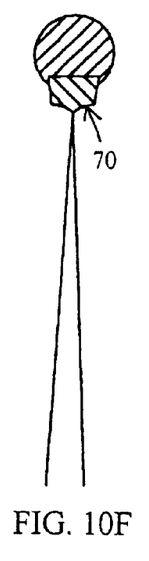
Figure 10G:
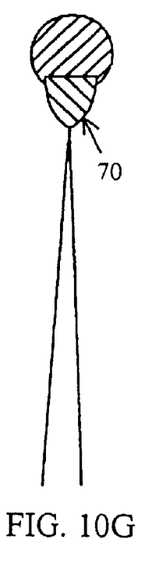
Figure 10H:
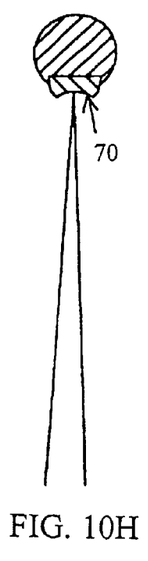
Figure 10I:
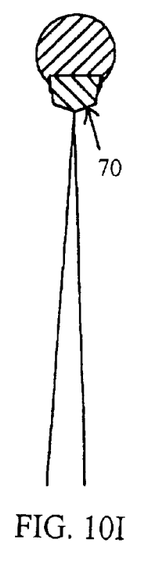

In an alternative embodiment, as shown in FIGS. 8 and 9, the EL panel 25 is affixed to the bicycle wheel rim 24. The location of the EL panel 25 on the bicycle wheel rim is dependent on the braking system of the bicycle.

In an embodiment, a bicycle braking system employs brake pads contacting the upper surface 74 of the wheel rim 70. The EL panel 25 is adhered to the lower surface 72 of the wheel rim 70 near the spokes 54.

In an alternative embodiment where the bicycle comprises a disc braking system that applies pressure at the hub 56 of the bicycle wheel 23, the EL panel 25 can be applied to either the upper surface 74 or the lower surface 72 of the bicycle wheel rim 70.

FIGS. 10a–10i depict an alternate wheel rim 70 to which the subject invention may be applied.

In an alternative embodiment, the EL panel 25 is shaped to fit around the spokes 54 on the rim 70 of the bicycle wheel 23.

In an alternative embodiment, the EL system can be used on a unicycle or a tricycle.

In a further embodiment, a phosphorus coat is applied to the bicycle frame 10, rims 70, and spokes 54 to be illuminated. The phosphorus coat is coated with a layer of conductive transparent plastic or polymer that facilitates illumination.

In alternative embodiments, the subject invention can be applied to any wheel with spokes, including but not limited to, motorcycle wheels, moped wheels, wheel chair wheels, horse cart wheels, wagon wheels, car wheels, baby buggy wheels, and rickshaw wheels. All of which are referred to herein as a "cycle."

In an alternative embodiment, the EL system of the subject invention can be in kit form, including at least one EL panel 25 and power supply 26, where the EL kit includes materials and instructions for installation. The EL system can be used on any number of surfaces, only limited by the imagination of the user, including but not limited to, all terrain vehicles, motorcycles, mopeds, scooters, snowmobiles, jet skis, automobiles, boats, sail boats, row boats, planes, skate boards, snow skis, snow boards, sleds, bobsleds, dog sleds, and trailers It should be understood that the examples and embodiments described herein are for illustrative purpose only and that various modifications or changes in light thereof will be suggested to persons skilled in the art and are to be included within the spirit and purview of this application and claims.

We claim:

1. An electroluminescent (EL) system kit for illuminating an object during periods of low light comprising:

a) at least one electroluminescent (EL) panel, wherein said EL panel comprises an EL material sandwiched between an upper and a lower conductive substrate, at least one of said conductive substrates being transparent;

b) a means for securing said EL panel to said object, wherein said means for affixing said EL panel to said object comprises an adhesive material on said lower conductive substrate, said adhesive material and said lower substrate being covered by a peel away paper strip, wherein said EL panel onto said object, wherein said adhesive is interposed between said object and said EL material;

c) at least one power source, wherein upon installation said power source is electrically connected to said EL panel and affixed to said object, wherein said power source supplies an AC signal to said EL panel; and a set of installation instruction comprising steps for affixing said EL panel and said power source to an object and for electrically connecting said EL panel to said power source.

* * * * *

UNITED STATES PATENT AND TRADEMARK OFFICE
CERTIFICATE OF CORRECTION

PATENT NO. : 6,779,913 B2  Page 1 of 1
DATED : August 24, 2004
INVENTOR(S) : Niezrecki et al.

It is certified that error appears in the above-identified patent and that said Letters Patent is hereby corrected as shown below:

Column 4,
Line 54, "wherein said EL panel onto" should read -- wherein said EL panel is affixed to said object by peeling away said peel away paper strip and placing said EL panel onto --.

Signed and Sealed this

Seventeenth Day of May, 2005

JON W. DUDAS
*Director of the United States Patent and Trademark Office*